(12) United States Patent
Cohen et al.

(10) Patent No.: US 12,152,897 B2
(45) Date of Patent: Nov. 26, 2024

(54) CAM CRUSHER SYSTEM

(71) Applicants: Yosef Cohen, Brooklyn, NY (US); Joseph Salem, Brooklyn, NY (US)

(72) Inventors: Yosef Cohen, Brooklyn, NY (US); Joseph Salem, Brooklyn, NY (US)

( * ) Notice: Subject to any disclaimer, the term of this patent is extended or adjusted under 35 U.S.C. 154(b) by 0 days.

(21) Appl. No.: 18/443,777

(22) Filed: Feb. 16, 2024

(65) Prior Publication Data
US 2024/0192010 A1 Jun. 13, 2024

Related U.S. Application Data

(63) Continuation-in-part of application No. 18/243,550, filed on Sep. 7, 2023, now abandoned.

(51) Int. Cl.
*G08G 1/01* (2006.01)
*G01C 21/36* (2006.01)

(52) U.S. Cl.
CPC ..... *G01C 21/3626* (2013.01); *G01C 21/3605* (2013.01); *G01C 21/3679* (2013.01)

(58) Field of Classification Search
CPC ............ G01C 21/3626; G01C 21/3605; G01C 21/3679; G01C 21/3691; G01C 21/3629; G01C 21/3641; G01C 21/3652; G01C 21/3697; G08G 1/09675; G08G 1/096775; H04W 4/023; H04W 4/027; H04W 4/48; H04W 76/14; H04W 4/02; H04M 1/6091; H04M 2250/74; H04M 1/72457
USPC ..... 340/933, 995.2, 995.24, 988, 990, 995.1
See application file for complete search history.

(56) References Cited

U.S. PATENT DOCUMENTS

| | | | |
|---|---|---|---|
| 10,387,487 B1* | 8/2019 | Svendsen | G06F 16/9535 |
| 2007/0120707 A1* | 5/2007 | Donnelly | G08G 1/02 340/933 |
| 2009/0281722 A1* | 11/2009 | Bitonti | G06F 16/9537 701/408 |
| 2016/0006922 A1* | 1/2016 | Boudreau | H04N 23/661 348/207.1 |
| 2017/0241788 A1* | 8/2017 | Chin | G01C 21/343 |
| 2018/0031385 A1* | 2/2018 | Bostick | G08G 1/096827 |
| 2020/0110554 A1* | 4/2020 | Yang | G06F 3/0679 |
| 2020/0211387 A1* | 7/2020 | Noy | G01C 21/3697 |
| 2020/0312063 A1* | 10/2020 | Balakrishnan | G07C 5/008 |

* cited by examiner

*Primary Examiner* — Anh V La
(74) *Attorney, Agent, or Firm* — Joshua Kaplan, Esq; Kaplan Law Practice LLC

(57) ABSTRACT

The disclosed system comprises parent data storage containing third party data received from a data receiver. The data receiver is configured to receive all type of data and in particular, locations of known traffic hazards and enforcement points that is gathered from official sources for such information and from community contributions of users of the disclosed system. The data receiver is used in pair with data transmitter to send and receive data to and from client devices. The data received from client devices may be comprised of login information, data purchases and community contributions from users of traffic related information. User data comprising traffic information may be manually or automatically configured as private, semi-private or public. Data transmission may include retransmission of private uploads of traffic information from the various client devices, as well as data feed received from official sources towards client devices.

29 Claims, 19 Drawing Sheets

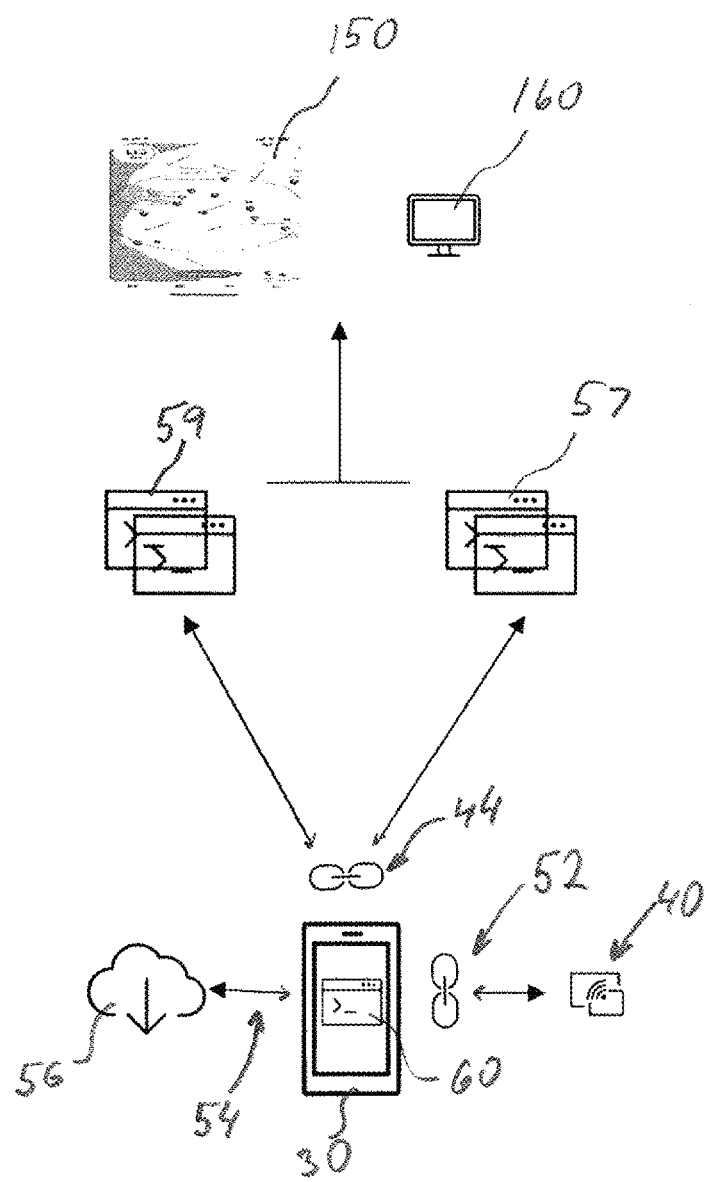

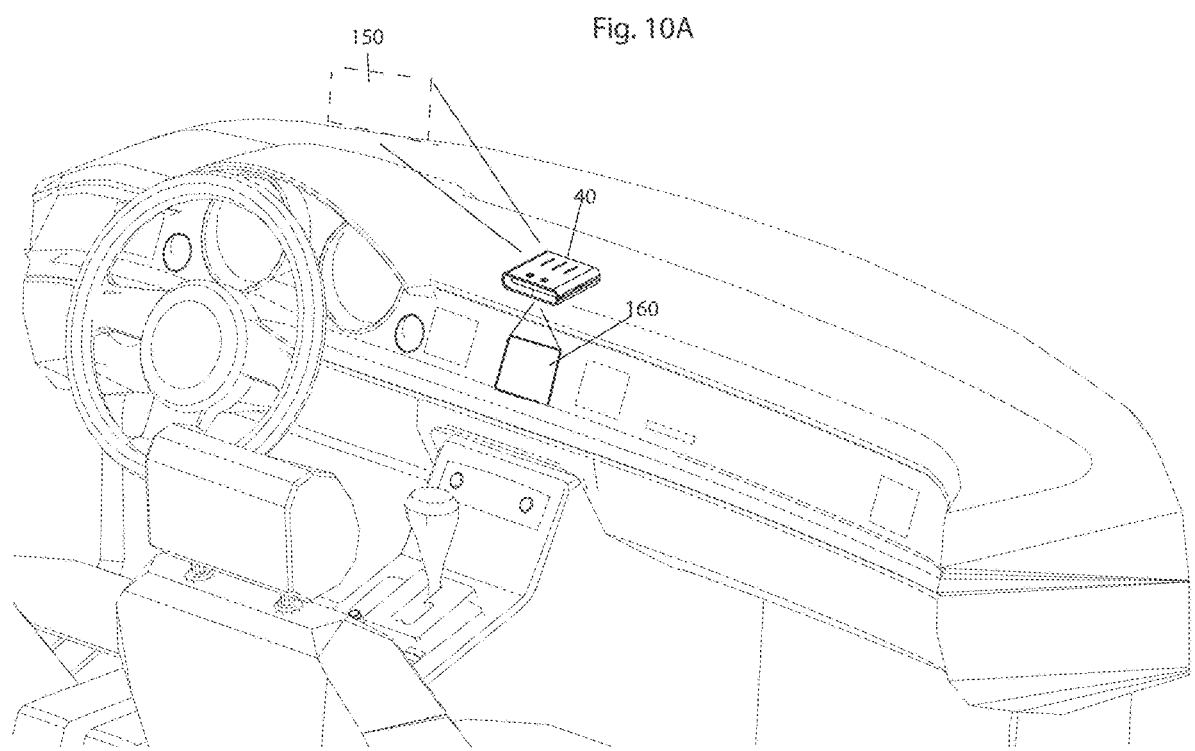

CAM CRUSHER SYSTEM

CROSS-REFERENCE TO RELATED APPLICATIONS

The present application is a continuation in part of the U.S. Non-Provisional patent application Ser. No. 18/243,550 filed on Sep. 7, 2023 the contents of which are included herein by reference.

FIELD OF INVENTION

The present invention is related to alert users of roadways regarding the presence of surveillance or law enforcement presence without being a distraction to the driver.

BACKGROUND OF THE INVENTION

Technological advancements have permitted government authorities and law enforcement to maintain observation of critical infrastructure without being present or seen. Presently this is being done with sensors and video equipment that not only detects activity but is also able to quickly and accurately identify the responsible parties.

The current art lacks the training element, where motorists are conditioned to be aware of the local traffic laws irrespective of whether law enforcement activity is visible. A motorist who is perpetually aware of an ongoing and ceaseless enforcement of traffic laws will be a cautious and law-abiding motorist, and who will eventually be conditioned to naturally follow traffic laws and posted speed limits.

While ongoing technological advancements in traffic monitoring are well intentioned and will provide huge dividends in terms of a safer environment on the thoroughfares, they are often accompanied by little or no public notice. Therefore, the public tends to focus on the punitive aspects of such a system at the expense of the obvious benefits, which undermines the conditioning process. It is therefore highly desirable to provide a system that on the one hand gives the public a measure of predictability and control, by making the enforcement techniques a little more visible.

While similar approaches have been undertaken by other navigation system providers, such as Waze®. However, these systems are at a severe disadvantage when it comes to the use of temporary traffic enforcement measures, and monitoring mounted on vehicles. The existing solutions lack sufficient flexibility to quickly adapt and absorb information taps coming from a slower subscription-based source, and publicly supply materials. With this comes the need to control clutter and provide the ability to filter and exclude traffic enforcement information, that current solutions do not have. Additionally, existing applications constitute significate distraction to the drivers, with directions and alerts appearing on the same screen, promoting clutter and sapping driver's attention away from actual driving. Therefore, by promoting traffic enforcement awareness, the present solutions also increase the hazards of using them when driving.

Therefore, what is required is a monitoring solution that is highly adaptable to ever changing patterns and yet requires no awareness on the part of the driver unless a trap is detected, and at that point, the driver is alerted in an incidental and passing manner that minimizes the hazards of using the alert methods, while maximizing the effectiveness of such method.

SUMMARY OF THE INVENTION

The present disclosure is designed to raise awareness among the general motorizing public that law enforcement is ensuring that key thoroughfares and infrastructure areas are being used properly and safely. As a side benefit of the system, users of the system will necessarily need to take proper precautions, including being more attentive and careful drivers, in their efforts to avoid costly citations.

The disclosed system comprises parent data storage, which is fed third party data by way of a data receiver. The data receiver is configured to receive all type of data and in particular, locations of known traffic hazards and enforcement points that is gathered from official sources for such information and from community contributions of users of the disclosed system.

The data receiver is used in pair with data transmitter to send and receive data to and from client devices. The data received from client devices may be comprised of login information, data purchases and community contributions from users of traffic related information. The data received from client devices in the form of traffic information contributed by users may be determined by each user of the client device as private, semi-private or public. Data transmission may include retransmission of private uploads of traffic information from the various client devices, as well as data feed received from official sources towards client devices.

Therefore, in one embodiment, data receiver is configured to receive data from a third-party data transmission source, such as an official source of such data, and from at least one client device; and where the data transmitter is configured to send data to the at least one client device.

The client device is configured to operate a computer application. The computer application receives data from parent data storage, organizes and manages alerting system for the user of the client device and may have at least two second alert receivers, that receive alerts from the client device. One of the second alert receivers may be one or more client devices of other users that are associated together as a group of friends, acquaintances, collaborative group or social media participants subscribing or being members of a data stream from said social media. The other of the second alert receivers would be a physical alert device that is configured to listen for signals from a client device. The messages sent from the client device to the physical alert device would prompt the physical alert device to emit noticeable, yet unobtrusive, signals that would alert the driver to an impending traffic enforcement zone or another roadway hazard.

The signal emitted by the physical alert device does not require the user to shift attention from ongoing activity of driving, and does not capture driver's gaze, but merely puts the driver on notice. The driver may, when time and conditions permit it, or at the driver's own peril examine further details about the hazard by querying the computer application on the client device but does not need to do so to be continuously informed of incoming hazards.

In one embodiment, the physical alert device may be used to input navigational points of interest into the software application. The input is usually made with a press of a button or with a sequence of clicks or depressions marking the type of navigational point being referred to, or to identify whether the point of interest is a traffic camera, a speed sensor or whether it is to be classified as a permanent or a temporary input into the onboard storage of the client device or parent data storage. It is preferred that the physical alert device flashes a light signal, for example using the same light emitting device as used in an alert capacity, or a separate light emitting signal, or an audio signal, to confirm that the input has been registered with the software application.

In another embodiment, the software application will detect based on navigational data whether the client device is in an urban or highway setting, and based on this assessment, the input signals being received from the physical alert device are then automatically classified as temporary or permanent database updates, or either stored locally on the client device or further delivered to the parent data storage.

In another embodiment, the physical alert device may emit audio signals that identify traffic enforcement and hazards with particularity, such as "traffic camera in 50 ft," or "a speed sensor in 100 ft along ABC boulevard."

The computer application running on the client device is preferably configured to a) be constantly monitoring while in use, and b) preserve battery power in of the battery source of such client device which would necessarily be consumed to perform said monitoring. To this end there may be two processes running, a foreground process, which presents the application screen and displays data of the application wherein said computer application operating on said at least one client instance configured to execute at least one foreground process and at least one background process on a mobile electronic device. The foreground process would be configured to receive data from the parent data storage containing at least one navigational point of attention. In the meantime, the background process would be engaged in monitoring the geographic location and direction of the mobile electronic device on which the software application is running to determine whether the electronic device is in proximity with such point of attention, namely, a speed sensor/camera or a red-light camera, etc. The background process is then configured to send agitational signals to the physical alert device when the location and direction of travel of the mobile device satisfies a proximity condition enforced by the computer application. If the proximity to the point of attention and direction of travel is satisfied, the software application signals to the physical alert device to alert the user (the driver) that an attention point has been detected. For example, the user would then check their speed or surroundings to determine that no hazard is present and to ensure that the user is otherwise following all applicable traffic rules. The proximity condition, and the subsequent alerting, continues until users have traveled outside the detecting zone of a particular point of attention. The physical alert device is configured to produce an audio or visual signal on receiving the agitational signal from the background process. In an alternative embodiment the functions of the foreground and background processes may be reversed or otherwise different, or there may be additional or fewer processes handing the tasks described in this application.

BRIEF DESCRIPTION OF DRAWINGS

FIG. 3A is a diagram describing an embodiment having connectivity with an Entertainment or navigational systems of a vehicle.

FIGS. 8 and 9 show one embodiment of the physical alert device.

FIGS. 10 and 10A are contextual diagrams showing the physical alert device.

DETAILED DESCRIPTION OF THE INVENTION

Figure 1:
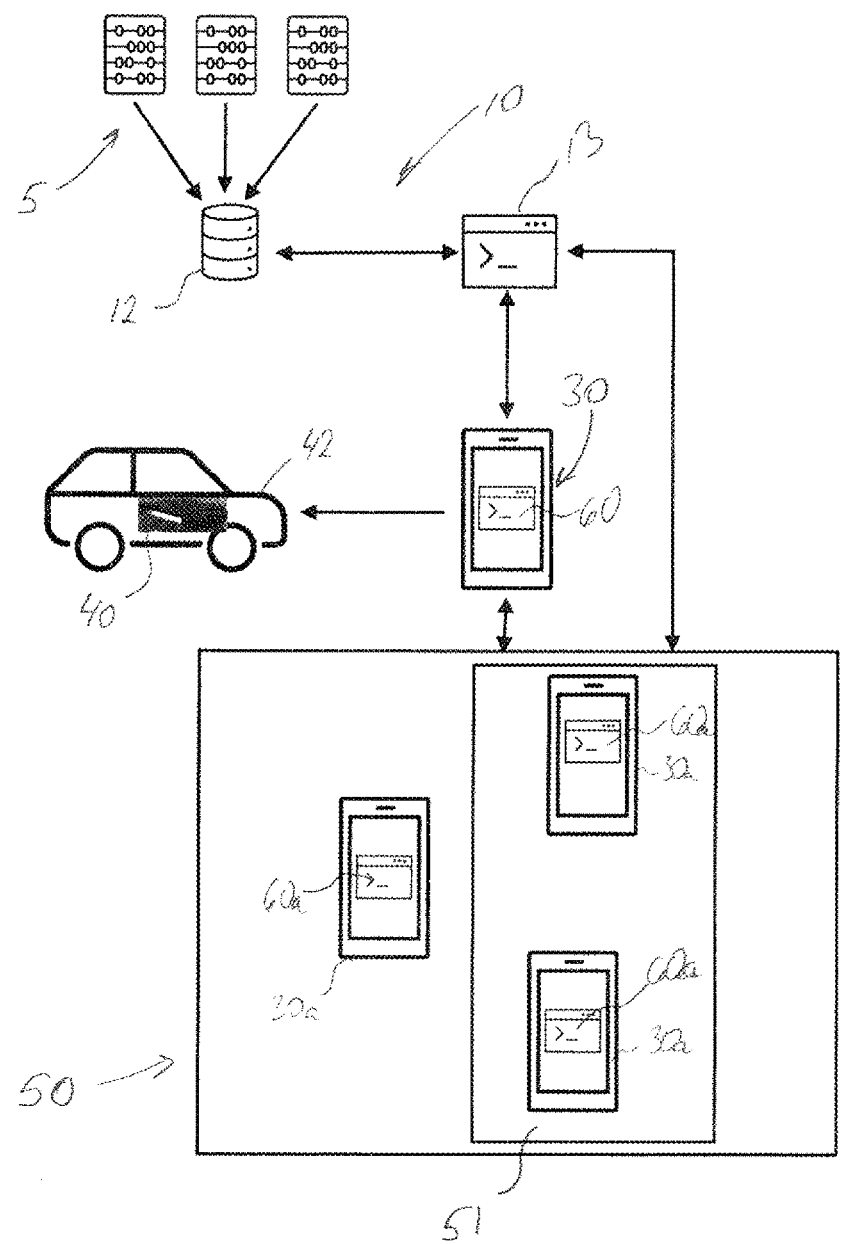
FIG. 1 is a high-level diagram of the overall effectiveness of the disclosed system in delivering information to a lot of users, creating a system of multiple sources of information.

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Disclosed in the figures is an alert system comprising a parent data storage 10. Parent data storage 10 preferably comprises a parent application component 13 and parent database 12. The parent application component 13 is responsible for managing subscriptions to the data stored within the data storage 10 and for managing user accounts of the disclosed system. The parent application component 13 is also responsible for receiving data received from client devices 30 and for parsing such data into user private data, user shared data and user generated information intended for the general public. The parent application component 13 is further responsible for synchronizing the durability terms of some data across the parent database 13 and data storage local to the client devices 30. Enforcing durability terms is important to control informational clutter and to ensure that the disclosed system can adapt to the changing enforcement and hazard landscape. In one example durability is enforced by the parent application component 13, which determines which hazard has been identified and added and by whom. For example, a major collision or road work/closure may automatically receive a temporary durability rating, whereas a camera sensor configured to measure speed or rolling through stop-sign violations would be more permanent in nature. Alternatively, durability can be configured at each client device 30, with or without the ability to be overridden by the parent application component 13. The client device 30 may additionally be configured to determine durability based on context. For example, based on the type of hazard reported or the customary of whether the reporting or visiting user is within his or her common travel area.

Database 12 is configured to receive data from third party official sources of data 5 which may be government or law enforcement databases. This data is then sent by the parent software process 13 to at least one client device 30. Preferably there may be a plurality of client devices 30a subscribing to the data from the database 12. This data is stored locally on each client device 30 or 30a. Additionally, a user of each client device 30 is able to populate the computer application 60 with additional enforcement or hazard data, which may then be shared directly by the computer application 60 on the device where such data has been initially entered with communities 50 and sub-communities 51 of client devices 30a, which may collaboratively assist each other in keeping track of ever-changing enforcement features. Each client device 30 from a plurality of client devices 30a would each accommodate user input occurring on each such device. The user input a navigational point of attention, which may be one of, but is not limited to, a recording of a roadway hazard comprising one or combination of a speed camera, red light camera, stop sign camera, roadwork, construction, road closure, accident, traffic jam, etc. The computer application instance (60) executing on each of the client devices 30 can be configured to automatically share some or all of the hazards of other client devices 30a in a group or local area of client devices 30, or may be configured to share user entries either based on the particular hazard being identified by a user, through the settings of the application on that client device 30, or at discretion of the user each time the entry is made.

The software application instance 60 on any client device 30 may contain at least one second alert recipient. One of the second alert recipients may be another software application 60a on a remote client device 30a. A remote client device 30a is preferably another one of the recipients of the parent data storage 10 but would represent a remote client device for a peer client device 30 that is publishing a user entry. As mentioned above, the publication of a user entered navigational point of attention from one client device 30 to or from a peer client device 30 may occur automatically based on a group or participation criteria or a hazard type, based on a configurable setting of the publisher or recipient or based on a one-time determination of the publisher or subscriber. A user of the remote client device 30a is also able to manually enter navigational point of attention for its own benefit, and/or to be uploaded to the parent data storage 10 for public benefit, or to be shared with other client devices 30 and 30a. Another secondary alert recipient is the physical alert device 40. The physical alert device 40 serves as the alert recipient to alert the user within the immediate physical vicinity of the physical alert device 40 of an approaching navigational point of interest through an audio or visual, or light signal. The physical alert device 40 is also the instrumentation that enables input of the navigational points of interest into the application instance 60 on the client device 30 that is physically proximate to the physical alert device 40, with said input eventually being reflected on per client devices 30 or within the parent data storage 10.

A user may add navigational points of attention using the screen 60b or input keys of a client device 30. A user may also use the physical alert device 40 to add navigation points of attention at the press of a button, without taking eyes of the road or traffic conditions. The data added in such manner may be deemed to be temporary or permanent data to be stored on the client device only or it may be temporary or permanent data to be shared with the parent data source 10. Any data added by a user using either the client device 30 or the physical alert device 40 may be removed by a user in the same manner, using a delete function or a sequence of button clicks on the physical alert device 40 that would translate to a removal.

The software application 40 on each client device 30 subscribes to parent data storage 10 to be able to receive at least one navigational point of attention. The navigational point of attention may include, but is not limited to, a traffic camera, a speed sensor, a police sentinel, a road condition, a construction condition, an accident, a weather hazard, a mob hazard, or any hazardous condition. The parent data storage 10 may also provide navigational data to each client device or such data may be stored locally on each client device. A user may add such navigational points of attention by hitting to input keys 110 on the physical alert device 40 when the client device 30 is within several dozen or several hundred meters from the navigational point, at the spot of the navigational point of attention, or departing from the navigational point of attention. A sequence of clicks, or a selection choice of navigational points to be added on the screen or a particular button would determine the navigational point of attention that would be displayed on the application running on the client device 30 or on client devices 30a associated with the inputting device by a common parent data source 10, data sharing among devices or a social media feed.

The software application 60 on the client device 30 is then calibrated use geo-positioning to determine whether the client device 30 is traveling toward a navigational point of attention, and if so whether the direction or path of this travel is vectored to intersect with such navigational point of attention. If the condition of travel and intersection satisfies a proximity condition enforced by the software application 60, the software application will dispatch an agitational signal to the physical alert device 40 which will emit an audio or visual signal alerting the user, who may be a driver of a vehicle where the client device 30 is present, of an approaching navigational point of attention.

Figure 2:
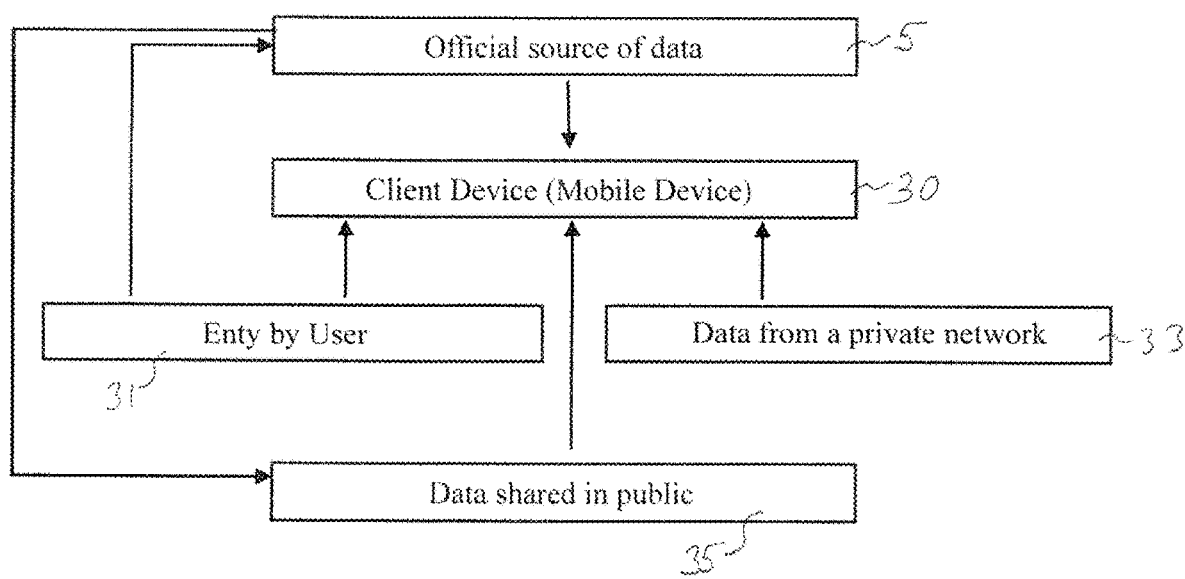
FIG. 2 is a diagram of the basic flow of data.

FIG. 2 demonstrates the various sources of data utilized by the software application 60 executing on a client device 30. The primary source of data sets the is official source of data 5 from the parent data storage 10. Some data sets may be entered by the user of the client device 30. For example, the user entry may include a user's local traffic camera or a vehicle-mounted sensor that will be present within proximity to the user area for some short period of time. The user may configure a privacy and duration setting, to determine whether such data should be shared on a private network 33. A private network may be a direct communication with an associate client device 30 or information received from a social media feed where an associated client device 30 may be publishing data or using said social media feed to upload information directly to a navigational point of attention to an associated client device 30. Some data may be received from unassociated client devices or other third-party sources via a public source 35. All such data may be uploaded to a parent data storage 10 to serve as a data backup for the uploading client device 30 and as means of data dissemination, in which case, it is preferable that the parent software process 13 will distinguish between private data, data shared only with client devices associated with the uploading client device 30 and data obtained from the public. It is preferred that the parent software process 13 will also maintain the duration of certain data sets, to gradually delete stale or outdated information.

Figure 3:
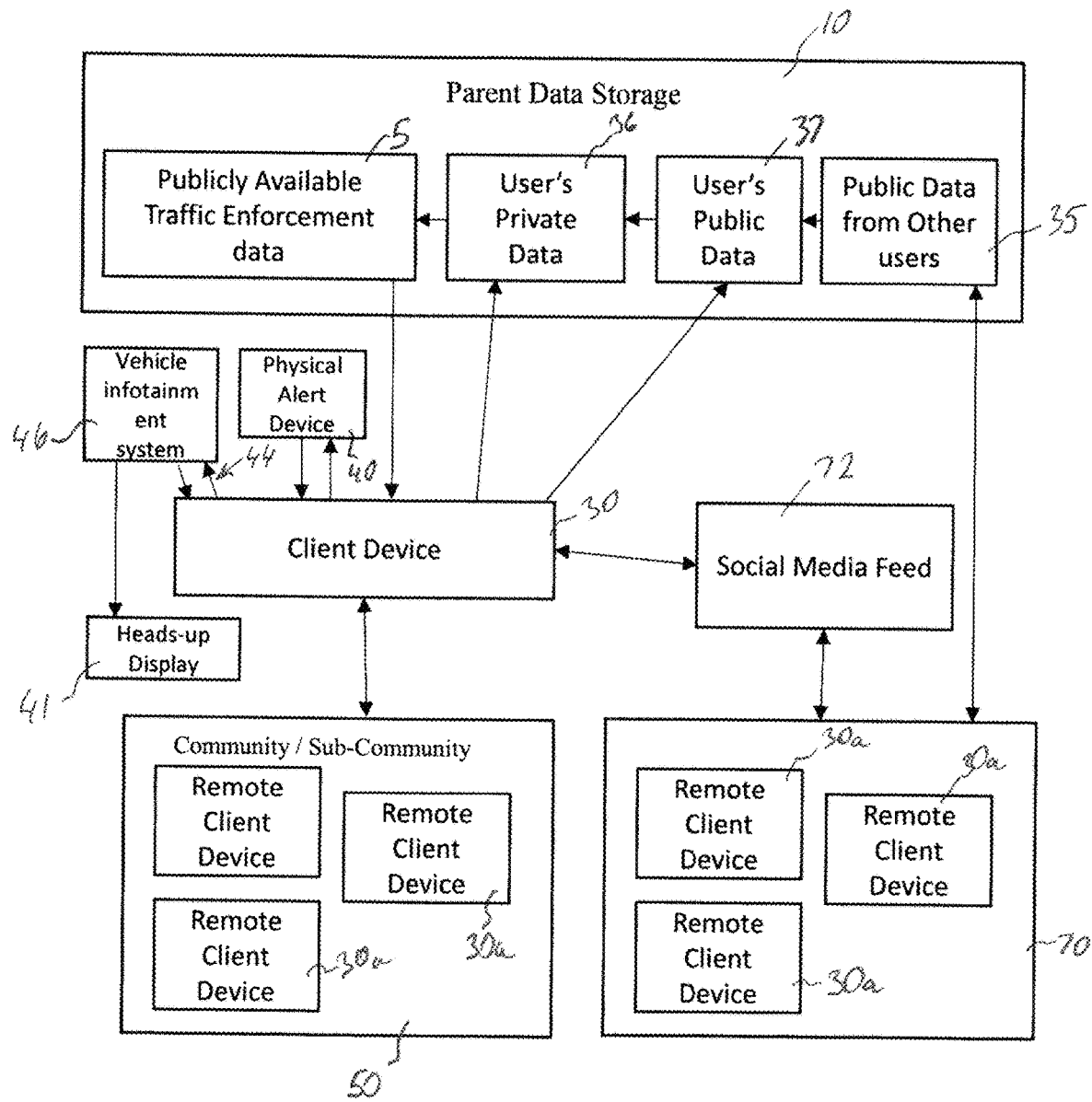
FIG. 3 describes the flow of data among users of the disclosed system and devices.

FIG. 3 further demonstrates all of the sources of data sets and their flow within the disclosed system. The client device 30 receives navigational points of attention, namely, traffic hazards, traffic enforcement and traffic condition data, or any other types of data, from the publicly or commercially available data storage 5. The user of the client device must create an account, or the account may be created automatically when a user of the client devices 30 purchases the software application 60 and downloads it from the parent data storage 10. The user's account and private information, such as billing information, or user's navigational entries classified as private, are then stored on user's private data 36, and stored first at the local storage of the client device 30 and then uploaded to the parent data storage 10 for data backup. A user may wish to share some navigational points of attention with other associated devices either directly to a community or sub-community 50 or associated/remote client devices 30*a*, or via social media feed 72 to the remote client devices 30*a*. It should be appreciated that remote or associated client devices both within a community 50 or subscribing to a social media feed 70 may themselves upload user public data, which for any particular subscribing client device 30 becomes a public data from other users. The client device 30 would be sending alert signals to the proximately located physical alert device 40, which would alert the user or driver of an upcoming traffic monitoring device or feature representing a navigational point of attention. At the same time, a user may utilize the physical alert device 40 to add or remove a navigational point of attention, which input being limited to the client device 30, or propagated to remote client device 30*a*.

In another embodiment the client device may contain a secondary channel or further demonstrates a supplementary communication function 44 of the client device 30. The supplemental communication function 44 may be used to connect to an infotainment system of the vehicle where the user is present, while simultaneously connecting to a physical alert device 40. Alternatively, either the supplementary communication 44 or the physical alert device 40 may be used, or both the supplementary communication 44 and the connection to the physical alert device 30 may be enabled on the client device 30 and ready to connect. In this manner either the vehicle's onboard infotainment system or the physical alert device 40 can be used to alert the user of a traffic feature requiring user's attention. The supplemental communication function 44 may be enabled by having the software application enabling a secondary radio communication channel having a different frequency or a different channel identifier. The supplementary communication function 44 may enable the client device 30 to connect to additional or other local devices without interference from the physical alert device 30.

The software application 60 may potentially create at least three communication instances. Shown in FIG. 3A is a basic connectivity topology of the disclosed cam crusher system. The client device 30 having the software application 60 may create a primary radio channel connection 52 for communications between the client device 30 and the physical alert device 40. Additionally, the software application 60 may be configured to connected with an application programing interface of a vehicle's entertainment system 57 or vehicles navigation system 59 (if entertainment and navigation systems are separate) or one common vehicle system. Such connectivity may be achieved through a separate supplementary communication function 44, which may be an additional radio transmission channel, or which may be a toggle between a radio transmission channel and a wired connection into a vehicle's circuitry. The vehicle's entertainment system 57 and/or the navigation system 59 will then produce an alert similar to the one generated by the physical alert device 40, or may integrate alerting with standard navigation features, while also displaying various navigational points of interest uploaded into the vehicle's entertainment system 57 and/or the navigation system 59 by the software application 60. A third radio connection utilized by the software application 60 is the internet interface 54 to the internet 56, which is used to send and receive messages to and from the parent data storage 10, client device communities (50) or social media and internet feeds (72 and 70).

Figure 3B:
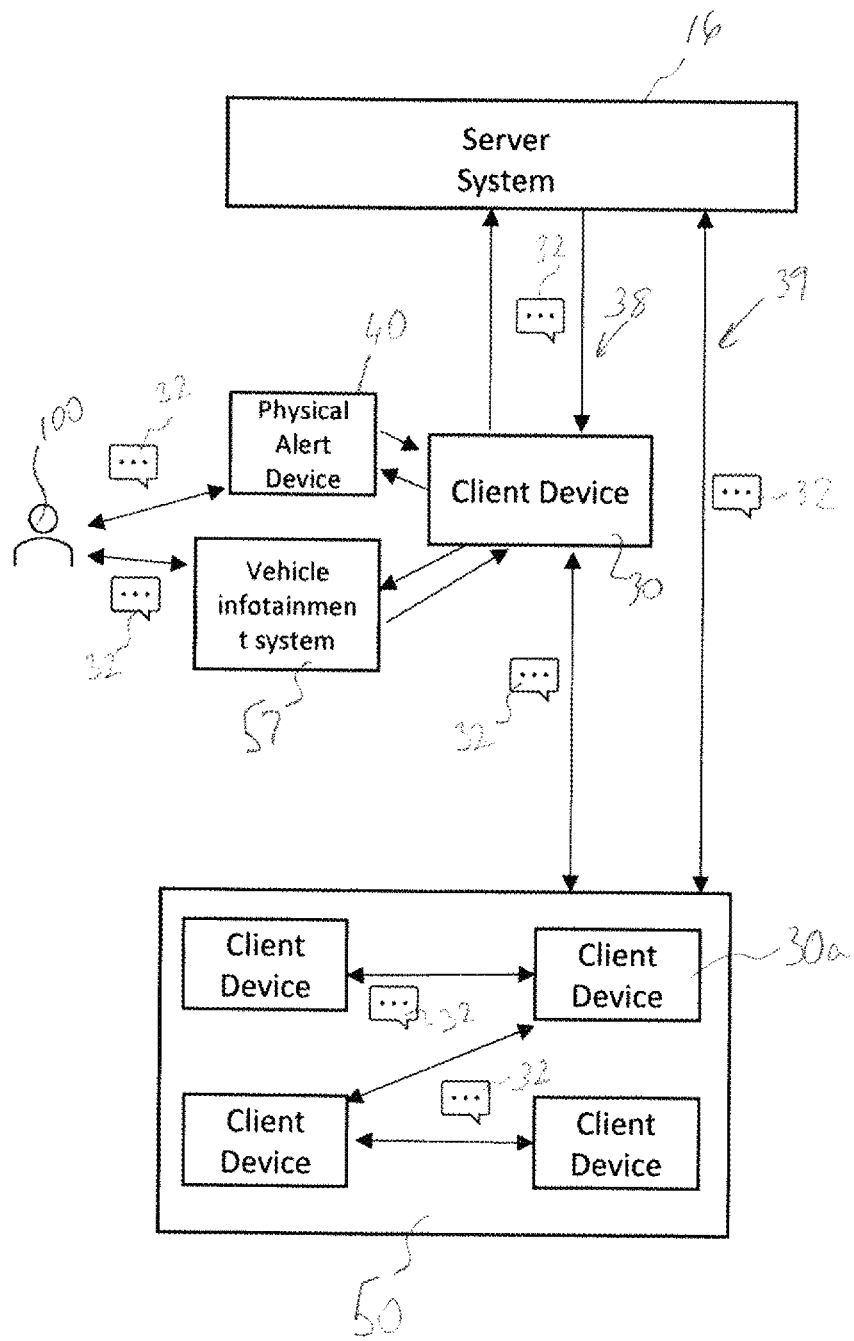
FIG. 3B is a diagram describing the software's application usage of short message functions.

FIG. 3B demonstrates the function of the software application (60) which allows users of the software application 60 executing on client devices 30 to communicate with other users of the software application, using coordinates of the client devices 30 that are nearby, or which are in the community or user group 50 together with the client device 30. The communication functionality permits users to send audio or text messages 32 to each other or to the entire group 50. Preferably a user 100 would utilize a voice activated command to initiate a voice memo 32 by speaking to the physical alert device 40 or to the client device 30 directly, or to the infotainment system 57 of the vehicle where the user 100 is presently located. A typical command may be initiated with signal phrase "Hey Cam Crusher . . . "; followed by a command, for example, "send a message to . . . ," or "reply to . . . ," and then the target device or group. A different or alternative audio command structure may be utilized to enable hands free operation of the features supported by the software application (60). The same commands and communication may be keyed in by the user 100 at the client device 30. The software application (60) may then share the message memo 32 through a central server 16, which may also be running the parent database 10, or the client device 30 may communicate directly with other client devices 30*a* using coordinates, telephone numbers of those devices, or address information, including group affiliation, directly to the instances of the software application (60) executing on the client devices 30*a*.

Additionally, it is preferable that the software application (60) is configured to detect the strength of a cellular network signal and may trigger additional downloads or uploads of data or messages 32 to or from parent database 10 or other client devices 30*a*.

Figure 3C:
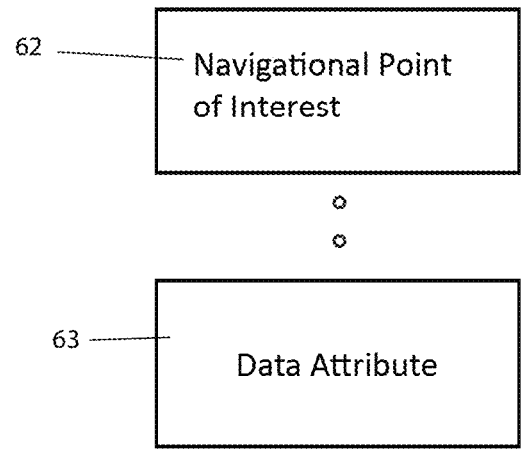
FIG. 3C is a diagram showing a dataset of data.

FIG. 3C further demonstrates a dataset 67, a plurality of which comprise the data of the database stored locally by the software application 60 on a client device 30 or stored centrally on a parent database 10. Each dataset 62 is preferably comprised of a navigational point of interest, such as a speed camera, traffic light camera, stop sign camera or a noise decibel sensor. Additionally, each navigational point of interest may be qualified with an automatic attribute 63, which may be a configurable item by a user who entered the navigational point of interest. The attribute will determine whether the navigational point of interest is permanent or temporary, private or shared, as well as the presentment of the color of the screen icon (80, 84, 85) that identify the navigational point of interest on the screen of the client device 30, or on the projection display 150.

Figure 3D:
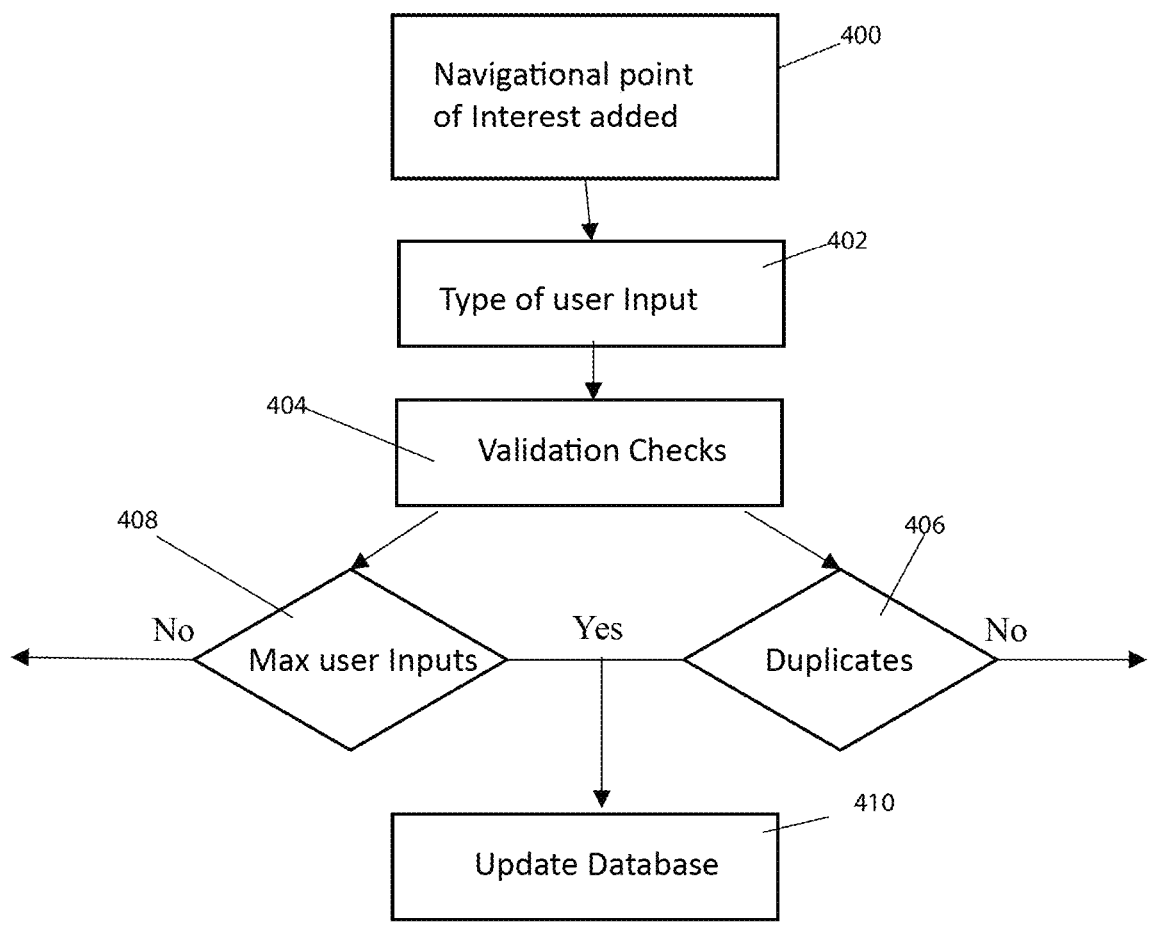
FIGS. 3D and 3E are additional software application diagrams.

FIG. 3D demonstrates the steps taken by the software application 60 that serve to update the onboard database of the remote client device 30 and/or the parent database 10. In step 400 the client adds a navigational point of interest using a physical alert device 40, the client device 30, or keys and voice entries on vehicle's infotainment system or vehicle's instrument panel (211, 212). Each entry is then verified in step 402 for validation 404, validation 404 may include, but is not limited to determining that the user has not exceeded his/her update limit 408. An update limit is set to avoid cluttering the system and avoid bogus entries, for example if a child is playing with a particular client device 30. The software application 60 also checks for duplicates in step 406, to prevent too many users alerting to a publicly published navigational point of interest. It is preferred that the validation steps are done locally and verified against the parent database 10 or the peer group 50 of the client device 30.

Figure 3E:
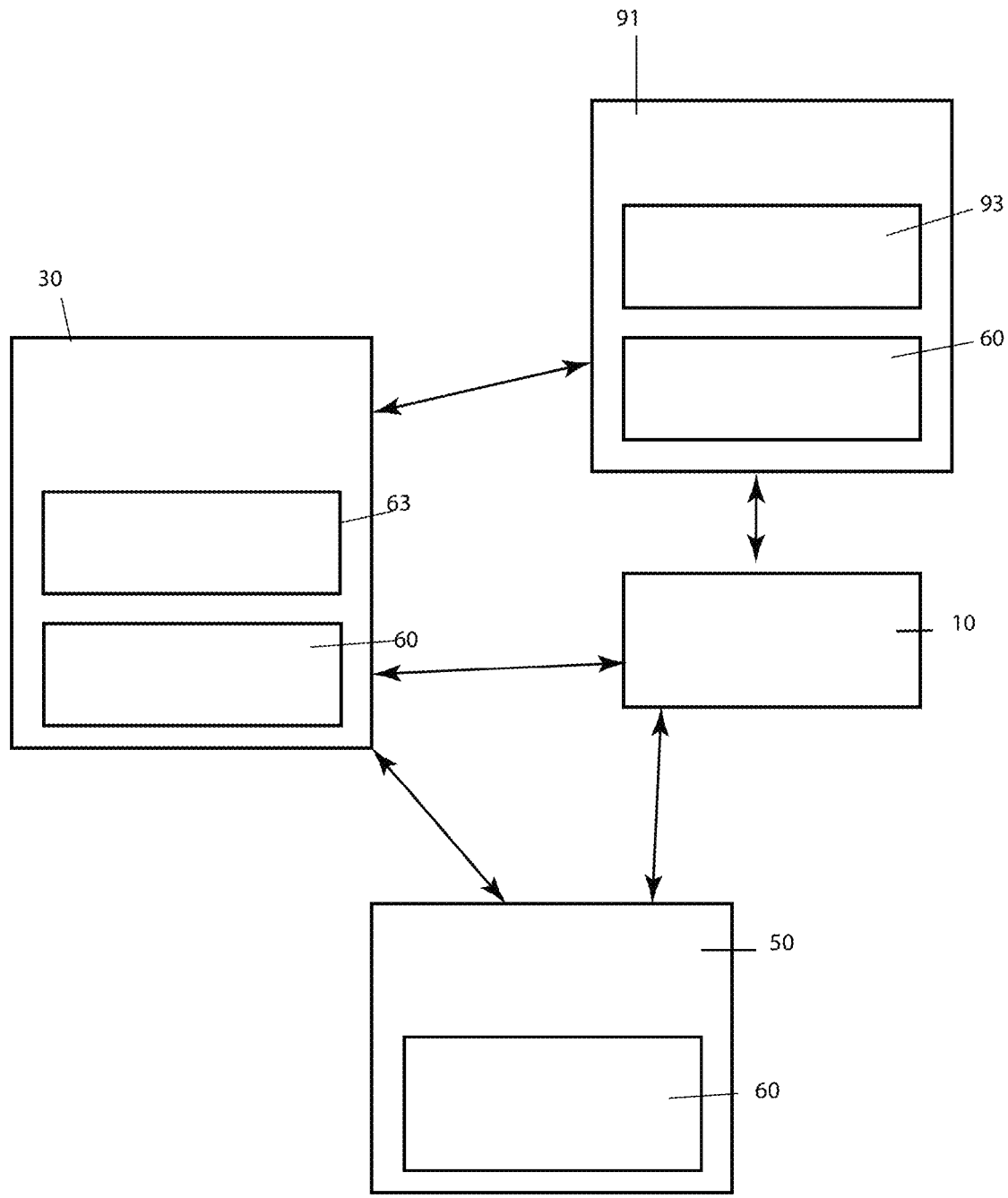

Described in FIG. 3E is the interplay between the client device 30 and the software application 60 running on the client device 30. The software application 60 interacts with other systems 63 that may be running on the client device 30 or the vehicle operating system 91. Some of the of the other system 63 that may be required to interact with the software application 60 are the global positioning components and navigational components, time components and connections to physical alert devices, such as the alert device 40, or the alert functions of the vehicle 91. All interactions occur locally at the client level 30 or at the vehicle level 91 or may be migrated across the vehicle 91, client device 30 or social network 50, all of which may update or be updated by the parent database 10. Features of the software application 60 that benefit from this interaction is a) an alert time delay feature and b) application only feature. The time delay feature is configured to detect when the device on which the software application 60 is running has stopped in proximity to a navigational point of interest. Usually this means that the vehicle or person has stopped moving and is waiting at a red light or is stuck in traffic. The time delay disables alerting for a period of time, or at least until the user or vehicle begins moving again. The application only feature detects when the software application 60 has no secondary alert device, such as a vehicle or a physical alert device 40, and it is able to alert using just the features available on the device, such as the speaker, illumination, light flashing or vibrations.

Figure 4:
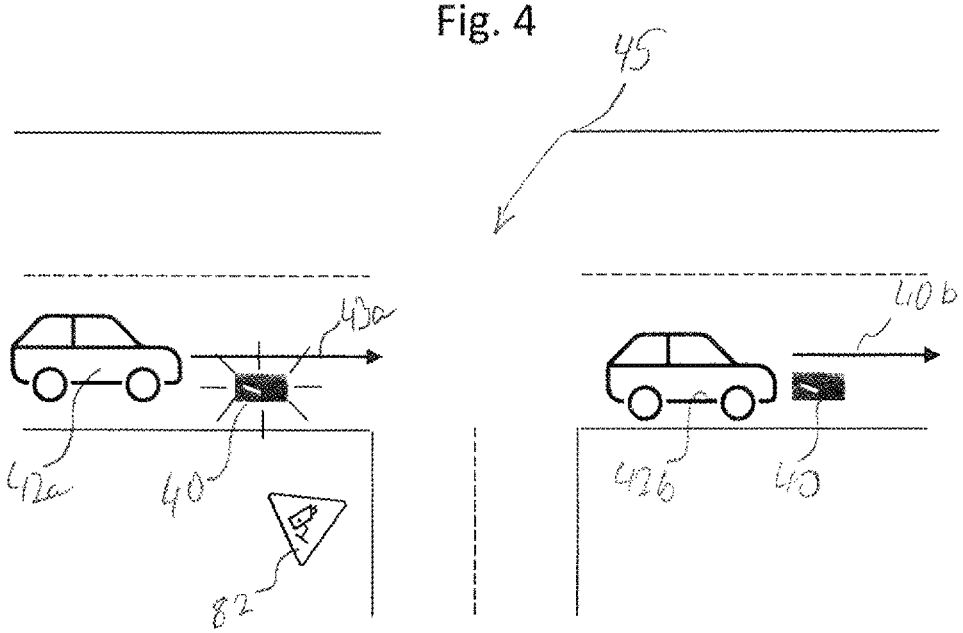
FIGS. 4 and 5 describe the basic operation of the alert system.
Figure 5:
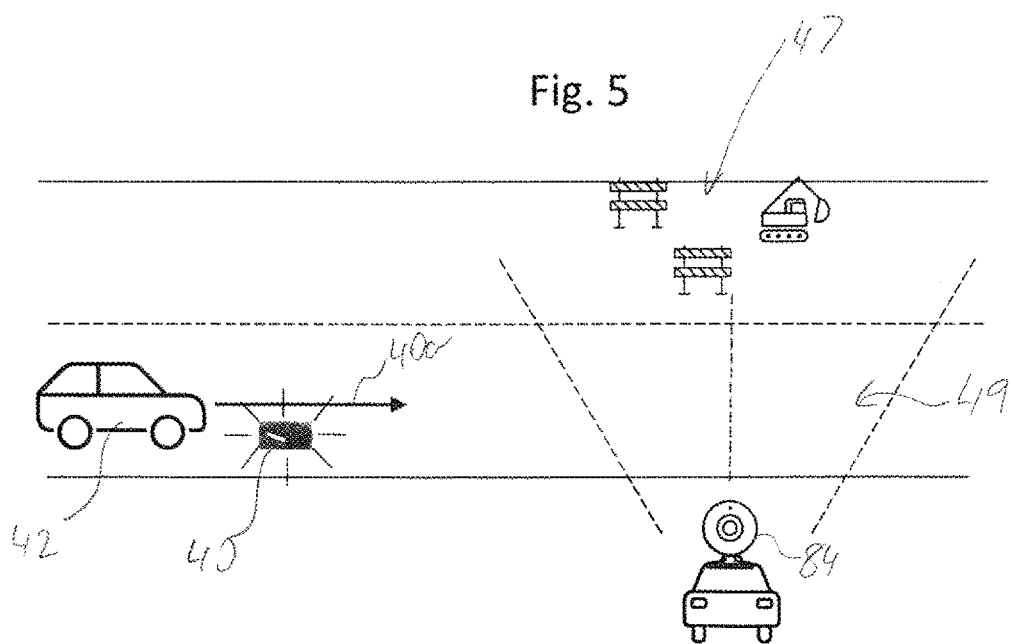

FIGS. 4 and 5 demonstrate the primary operation of the disclosed system. In FIG. 4, the navigational point of interest is traffic camera 82, which may be monitoring speed and/or compliance with traffic rules and signals, such as traffic light and stop sign. The initial information regarding the traffic camera 82 may have been received from parent data storage 10 or previously saved by the user via user entry using the software application 60 running on the client device 30 or by using the signal keys 110 or voice activation features of the physical alert device 40. Demonstrated in FIG. 4 is an instance where the software application 60 identifies the direction of travel 43a as vectored to intersect the enforcement area 45 of the traffic camera 82. Therefore, the software application 60 will dispatch an agitational signal to the physical alert device 40 when the vehicle 42a, carrying the client device 30 is in preset proximity to the traffic camera 82, which may be determined based on certain distance to the traffic camera 82. On the contrary, the vehicle 42b is moving away from camera 82, therefore the physical alert device 40 on board the vehicle 42b will remain dormant. It should be noted that sensor driven navigational points of attention, like the camera 82, or any other type of sensor, may still be capable of detecting non-compliant activity after a vehicle exists the immediate monitoring area of such a camera. Therefore, it is preferred that the software application 60 will continue to issue until the vehicle is well out of effective range that is on such sensor. This range of detection both on approach to the navigational point of attention and when departing or traveling away from it can be a configurable feature of the software application 60 executing on the client device 30 that is being utilized by the user (100). It should be noted further that all configurable parameters are preferably transferred by the software application 40 to the parent database 10 for each client device 30 to serve as a remote backup of user settings and configurations.

Additionally, as illustrated in FIG. 5A, the distance may be set in proportion to the ' of travel. For example, a warning signal within 100 feet of the navigational point of attention may be a sufficient warning for a slow-moving vehicle. This distance would need to increase to hundreds of feet or several miles for a vehicle traveling at highway speeds. The software application is preferably configured to calibrate issued alerts based on speed of the vehicle such that an alert is received in proportion to the time it takes to comply with the approaching navigational point of attention, for example to slow down, or lower the volume of onboard sound system. Shown in FIG. 5A is internal processing that may take place within software application 60, where a navigational point of interest is detected based on stored data of such points and vectored with the location and direction of travel. The software application 60 will then identify an appropriate distance required by a user and the vehicle to react to such point of interest. For example, a vehicle traveling at highway speeds will reach a navigational point of interest much faster than a slow-moving vehicle, therefore an alert must be calibrated to give a user sufficient notice depending on the user's speed of travel.

The alert projected by the physical alert device 40 is preferably determined in part based on the type of navigational point of interest being encountered. Therefore, an alert for a red-light camera 82 would be sounded when the client device 30 is approaching the camera, or in the immediate zone of coverage by the camera. On the other hand, a mobile enforcement unit (84) or a speed camera/sensor would continue alerting after the client device 30 has passed or is moving away from the sensor for some distance. This is the preferred calibration of the software application since some sensors continue to monitor and potentially lead to a citation even after a vehicle has left the immediate target zone. Depending on the specific navigational point of interest entered by a user using the client device 30, or the keys (110) on the physical alert device 40, the software application (60) would calibrate the duration or type of alarm to sound. For example, in an embodiment where the screen 48 of the alert device 40 is made of multiple LED lights a signal of a particular color or sequence of particular bulbs can indicate a red light camera, a different color or light sequence will indicate an approaching speed zone, yet a different color or light sequence will be indicative or an approaching accident, traffic or a noise decibel enforcement sensor. Alternatively, or additionally, alerts may be accompanied by an audio message played through the client device 30, the alert device 40 or the infotainment system (57) of the vehicle where the client device 30 and the physical alert device 40 are located. Alerts may indicate "approaching noise describe monitoring area, consider next left as an alternative route," or "approaching a speed monitoring zone, consider slowing down." The software application 60 is configured to serve as an alert device and to suggest potential alternative routes or corrective actions to avoid being cited by the monitoring sensors.

FIG. 5 demonstrates additional data that may be monitored by the software application 60. Shown is a vehicle 42 carrying the software application 60 running on a client device 30. The direction of travel 40a is vectored to intersect with at least one navigational point of interest that may be stored on the parent data source 10, namely, a construction zone 47 and a mobile traffic enforcement unit 84. Due to its nature, the mobile enforcement unit 84 will be classified by the software application 60 as a temporary navigational point of interest. While the mobile enforcement unit 84 will be uploaded to parent data storage as part of user's public data 37 and presented to other users by the parent data storage 10 as public data from other users 35, both the local software application 60 and the parent data storage 10 will be phase out or delete the mobile enforcement unit 84 within several hours or several days, depending on software configuration. Additionally, it is preferred that in the event that a mobile enforcement unit 84 has been added by another user for another client device 30a, that the parent data storage 10 and/or the software application 60 on the client device 30 is configured with requisite logic to inform a user attempting to add the same mobile enforcement unit 84 to the software application 60 that this mobile enforcement unit 84 is already present and the entry will be ignored, unless the entry is for a different or changed mobile enforcement unit 84.

Figure 6:
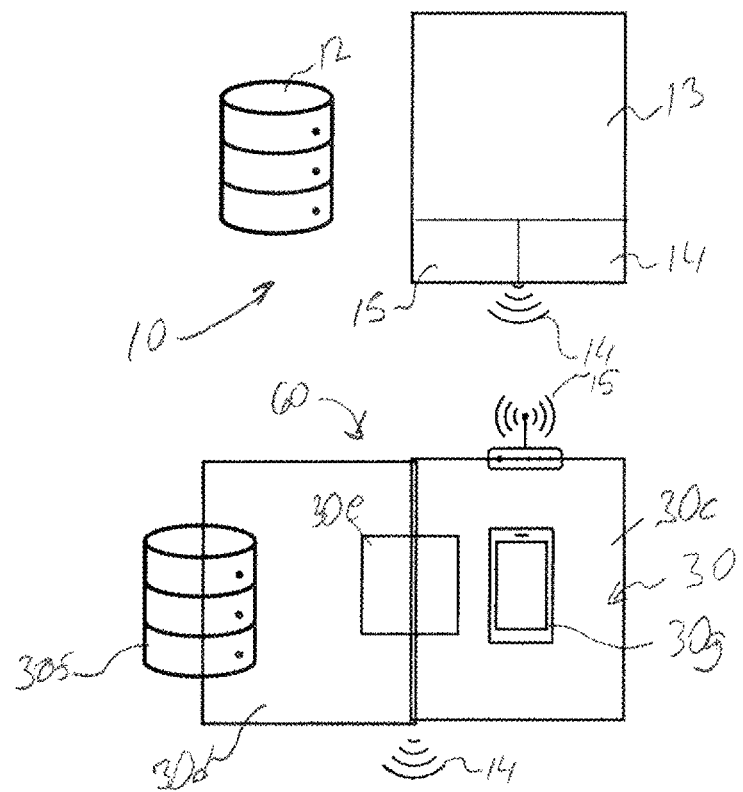
FIG. 6 describes one instrumentation embodiment enabling the disclosed system.
Figure 6:
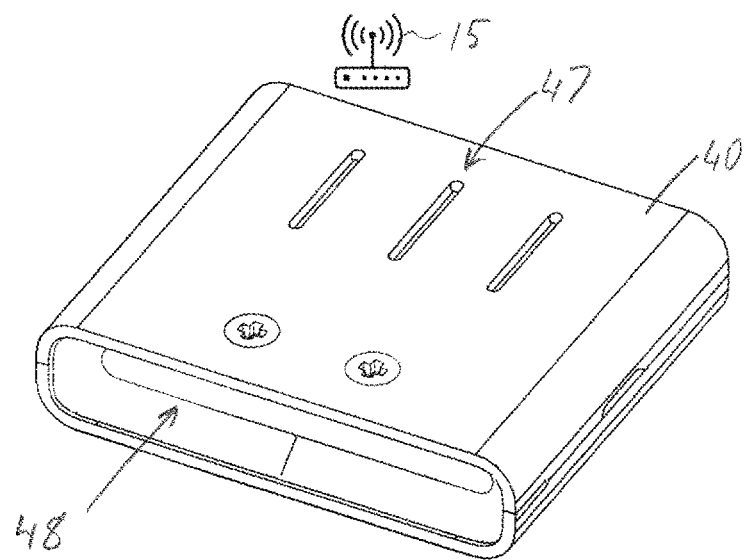

FIG. 6 demonstrates one embodiment of the disclosed system. Disclosed is the parent software process 13 and database 10 representing the parent data storage 10. The parent data storage 10 has a receiver process 15 and sender 14 to communicate with a third-party source of data 5 (FIG. 1) or with at least one client device 30.

The client device 30 may be comprised of a foreground process 30c connecting to a background process 30d through a bridge process 30e and containing a local data storage 30f. A receiver process 15 and sender process 14 interacts with the parent data storage 10 to send and receive navigational points of attention and further interacts with an alert device 40 to generate an alert via an onboard audio signal 47 or visual signal 48. The alert signal may be generated on the device 30g if the connection with the physical alert device 40 cannot be established. The foreground process 30c may be charged with parsing data sets received from the receiver process 15 and directing user entries to the remote recipients, such as the parent data storage 10 or a remote client device 30a, via the sender process 14. The background process 30d may manage ongoing monitoring of direction and speed of travel and location of the client device 30 against navigational points of attention stored on the local data storage 30f that is continuously being populated by the foreground process 30c with data sets from the parent data storage 10 and user entries. The foreground process 30c is also used to display navigational data and details on navigational points of interest and alerts on the screen of the client device 30g that is operating the client application 60. The software application may also comprise just one process capable of carrying out multiple tasks, or a plurality of processes, some of which may operate in the background and some in the foreground, of which some may have limited function or varied function. Alternatively, the roles of the background process 30d and the foreground process 30c may be reversed, or may otherwise be different, or there may be additional or fewer separated processes enabling the functionality of the software application 60.

Figure 7:
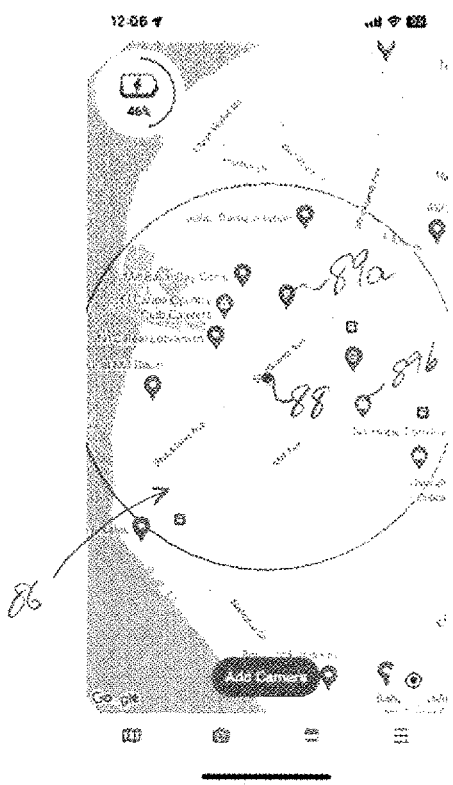
FIGS. 7 and 8 are screen representations of the foreground process and the function of the client device as a traffic enforcement and hazard alert system and as a navigational tool.
Figure 8:
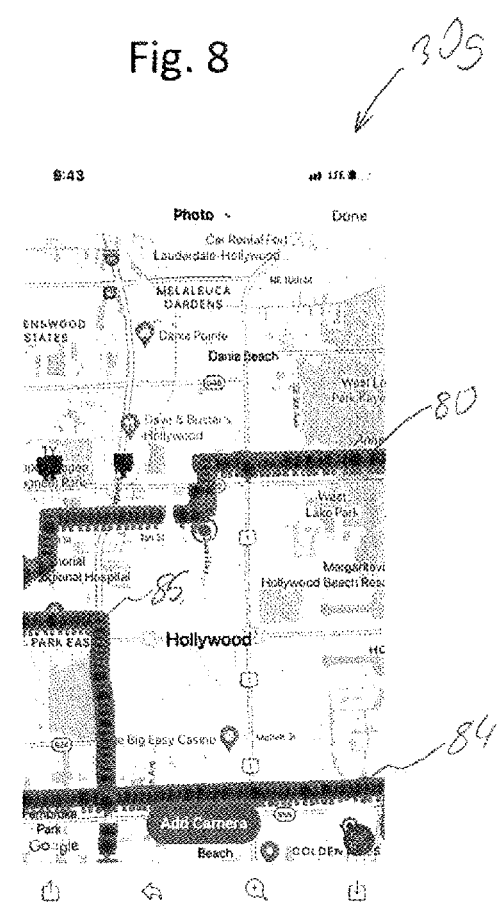

FIGS. 7 and 8 demonstrate the software application screen 30g. FIG. 7 demonstrates one screen embodiment showing both navigational data and proximity data 86 showing various navigational points of attention 89a and 89b within the requested proximity 86. It is preferred that the screen may be equipped with a daylight feature, that would display the navigational data and screen icons (80, 84, 85) showing navigations points of attention in colors more natural or noticeable during daylight level at that time, with different background and icon colors during the night. This feature may be enabled automatically or manually through the software application's settings screen.

FIG. 8 demonstrates a plurality of navigational points of attention 80, 84 and 85. The user may enter as many or as few navigational points of attention. Some of the navigational points of attention may be supplied via official or commercial sources (5) and represent relatively permanent traffic enforcement or hazard locations. Other navigational points of attention may be unique or private to the particular screen 30g being viewed, having been entered as a user's private information. In one embodiment, each of the navigational points of attention 80, 84, or 85 are color coded based on particular point of attention represented, so that a user may tell at a glance what point of attention the vehicle is approaching or the source of the point of attention. For example, a red-light camera 84 may be represented by a red flag, while a speed camera sensor 80 may be represented by an orange flag. Additionally, if the red-light camera 84 was loaded using a parent database 10 it may have a color coded outline or frame that indicates that it came from a parent database 10 and thus most likely represents a permanent fixture. On the other hand, a speed sensor on a highway entered by a passing user may have a different colored outline or a frame of a different color or shape that would indicate a user entry, or a temporary entry. The software application 60 of the device that received the user entry may determine automatically whether the entry is short term, long term or permanent based on factors such as the type of navigational point of interest entered, the time of day, the speed of the vehicle, the response from other users, etc. The term and/or color of each navigational point of interest will then be communicated to the parent database 10 or to at least one other client device 30 and represented on the receiver device with accurate term and color of the inputting device. Other points of attention may have been shared via community (50) or social media/internet feed (72, 70) from other client devices (30a).

Figure 9:
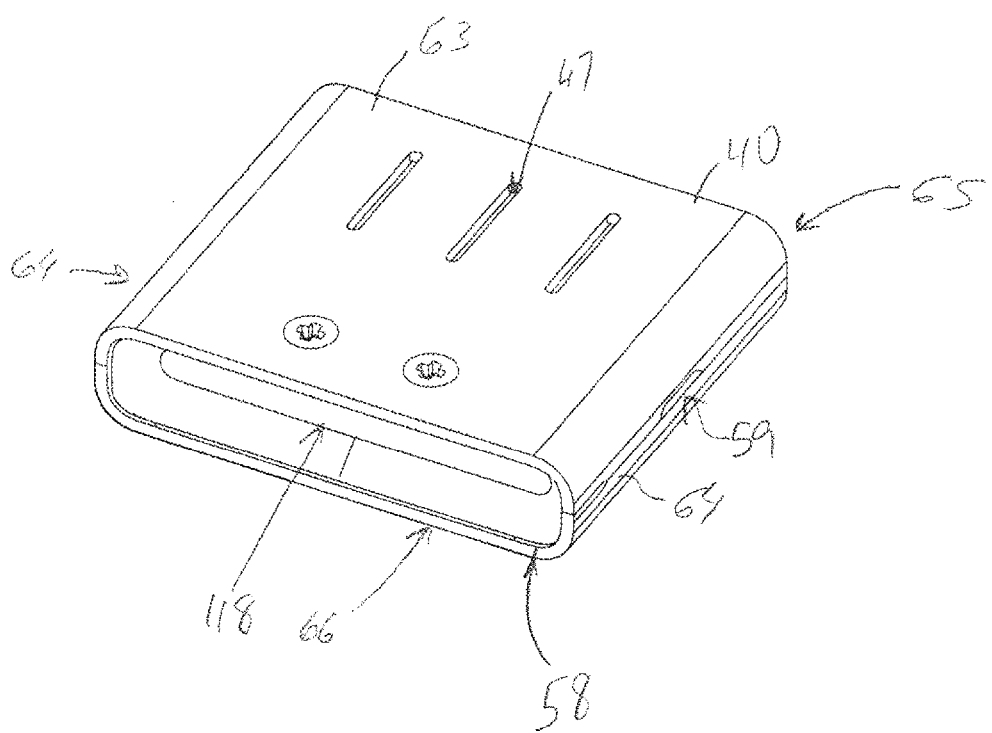
Figure 10:
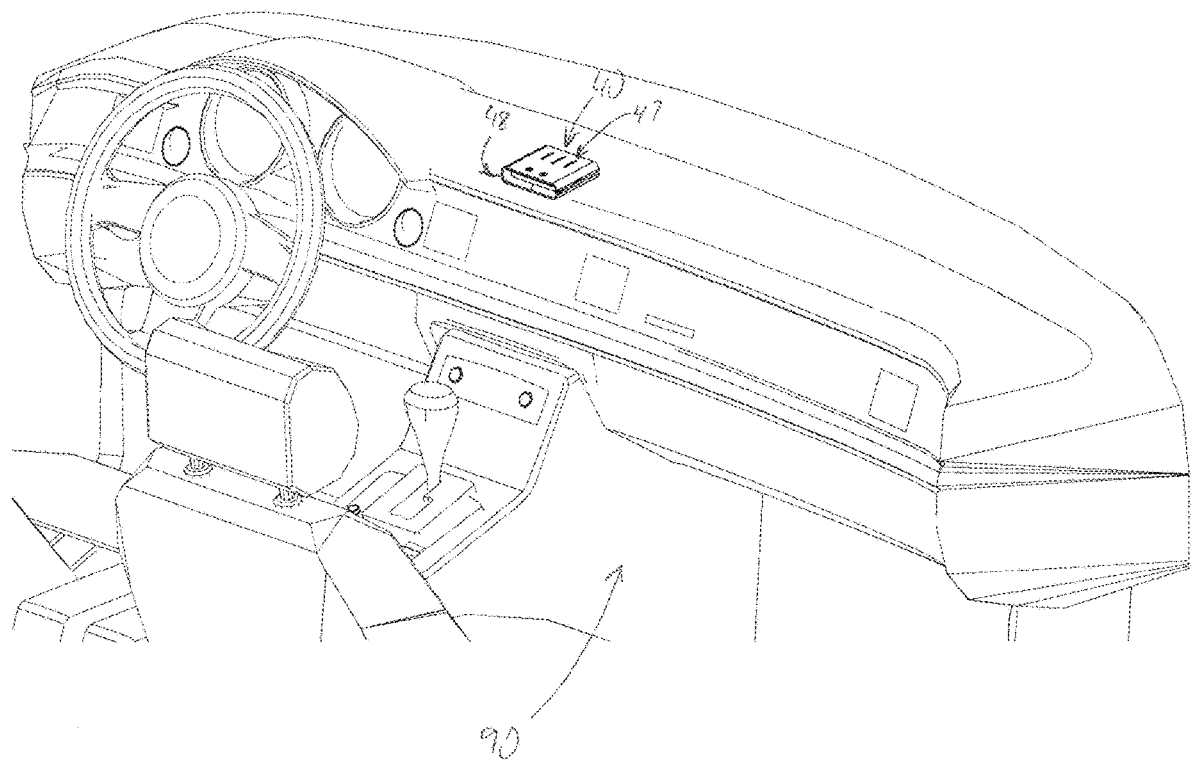

FIGS. 9 and 10 demonstrate a physical alert device 40. The physical alert device 40 preferably contains a data or signal receiver (15) that may receive communication from a background process 30d from a software application 60 in close proximity to the physical alert device 40. The physical alert device 40 preferably contains an onboard power source that may be replaceable or rechargeable via port 59. The physical alert device 40 may additional be powered directly from an external circuitry, such as the vehicle power system by utilizing a universal serial port connection, a power port connection, or a cigarette lighter port connection. Physical alert device 40 may additionally be equipped with an onboard coil element for proximity charging. The physical alert device is configured to emit a warning signal on receiving an agitational signal from a proximate software application 40. The warning or alert signal may be a light alert signal coming via the screen 48, which may be a simple flashing or steady light emitting diode, or which may display additional information using a liquid crystal display. Preferably the alert signal may instead or additionally issue from an onboard audio speaker 47, which may be a chime, a sharp strike, or a siren, or an audio message such as "mobile enforcement device 200 feet ahead," or "speed sensing radar one mile."

FIG. 9 demonstrates the alert device 40 that is shaped as a parallelogrammical cube having a top wall 63 a bottom wall 59, sidewalls 64, a back wall 65 and a front wall 66 being placed on the dashboard 90 of a vehicle's interior. The physical alert device 40 may also be shaped as a cylinder, a sphere, a pyramid, or any other three-dimensional geometric shape. At least one or more of the walls may contain mounting means, such as hooking device, an adhesive strip, a hook and loop or snap two-part connector or a magnetic connector. The placement of the device need not be in front of the driver as the alerting flashing and sound can be heard from general proximity of the vehicle's interior, and furthermore, driver need not shift his/her attention to the device for the alert to be effective. The physical alert device may be rechargeable or connected to on board power source.

Figure 9A:
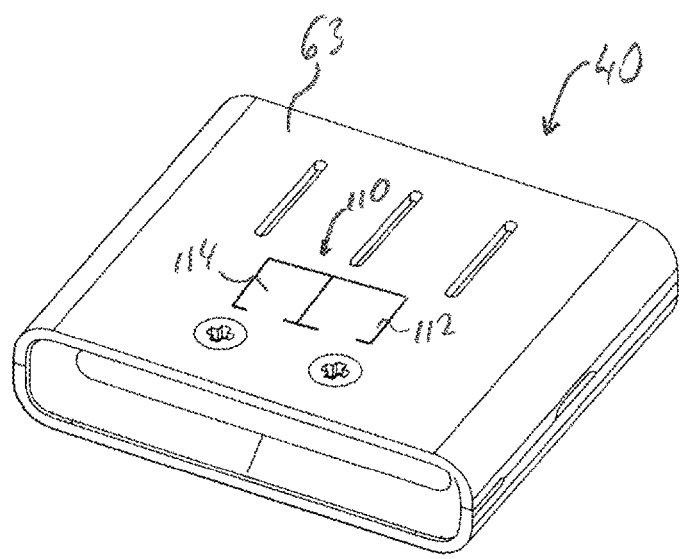
FIGS. 9A, 9B, 9C, 9D are various diagrams showing the physical alert device.

In one embodiment shown in FIG. 9A, a user may engage the software application on the client device 30 through the physical alert device 40. Therefore, in one embodiment the top wall 63 or either of the sidewalls 64 may contain one or more buttons 110. For example, shown is an impose button 114 and a delete button 112. A user will press the impose button 112 on coming across a navigational point of interest that has not been previously added by the user or received from the parent data store 10 to be displayed on the screen of the client device 30. The navigational point of interest added in this fashion may be deemed temporary or permanent on the software application and depending on user settings or application logic be shared with remote client devices 30b or uploaded back to the parent data source 10. Alternatively, the inputs may be classified by button clicks, such as a single click for a camera, two clicks for a temporary camera 3 clicks for permanent camera, four clicks for a speed trap dual press (112 and 114) for temporary speed sensor or double dual press for a permanent one, and a single right click of button 112 for delete, and so forth.

Figure 9B:
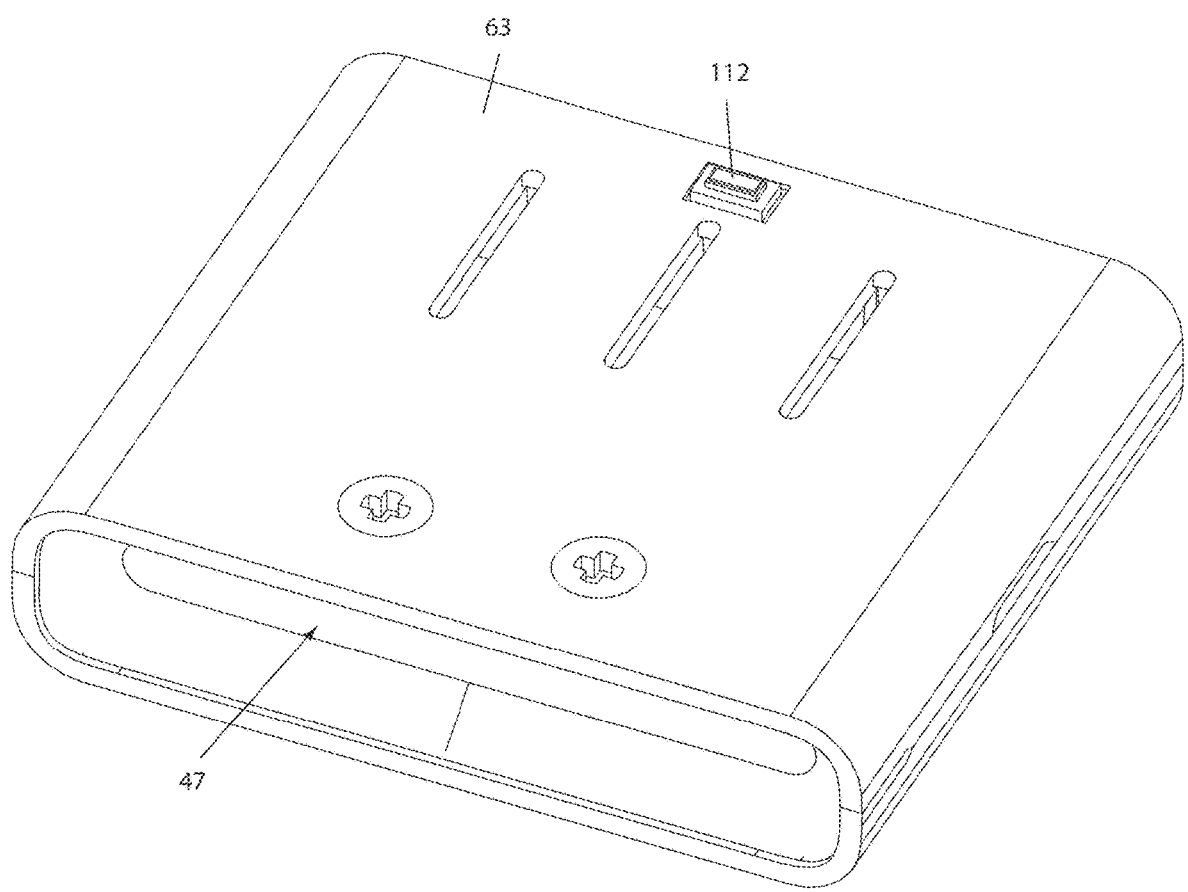
Figure 9C:
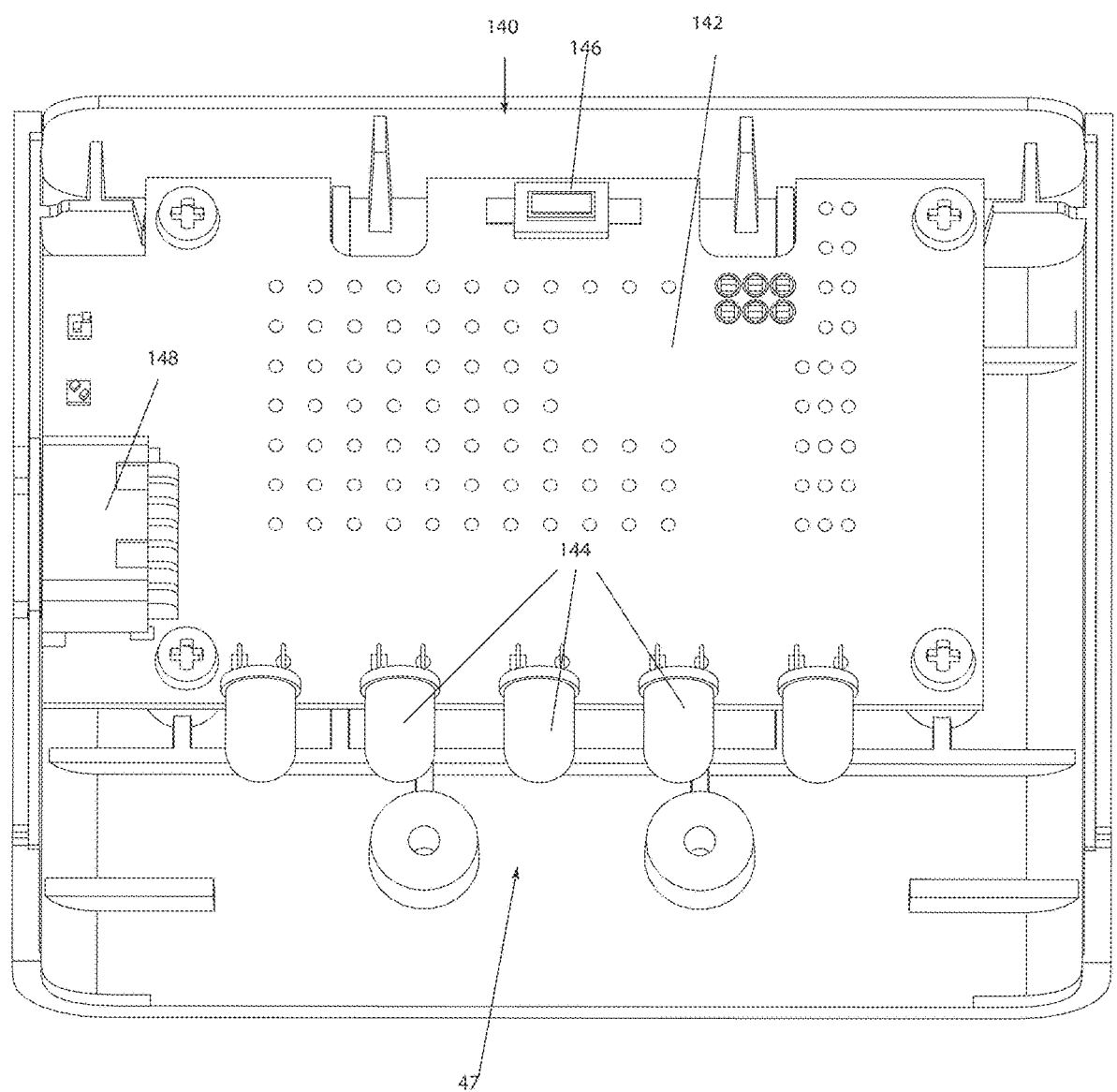
Figure 9D:
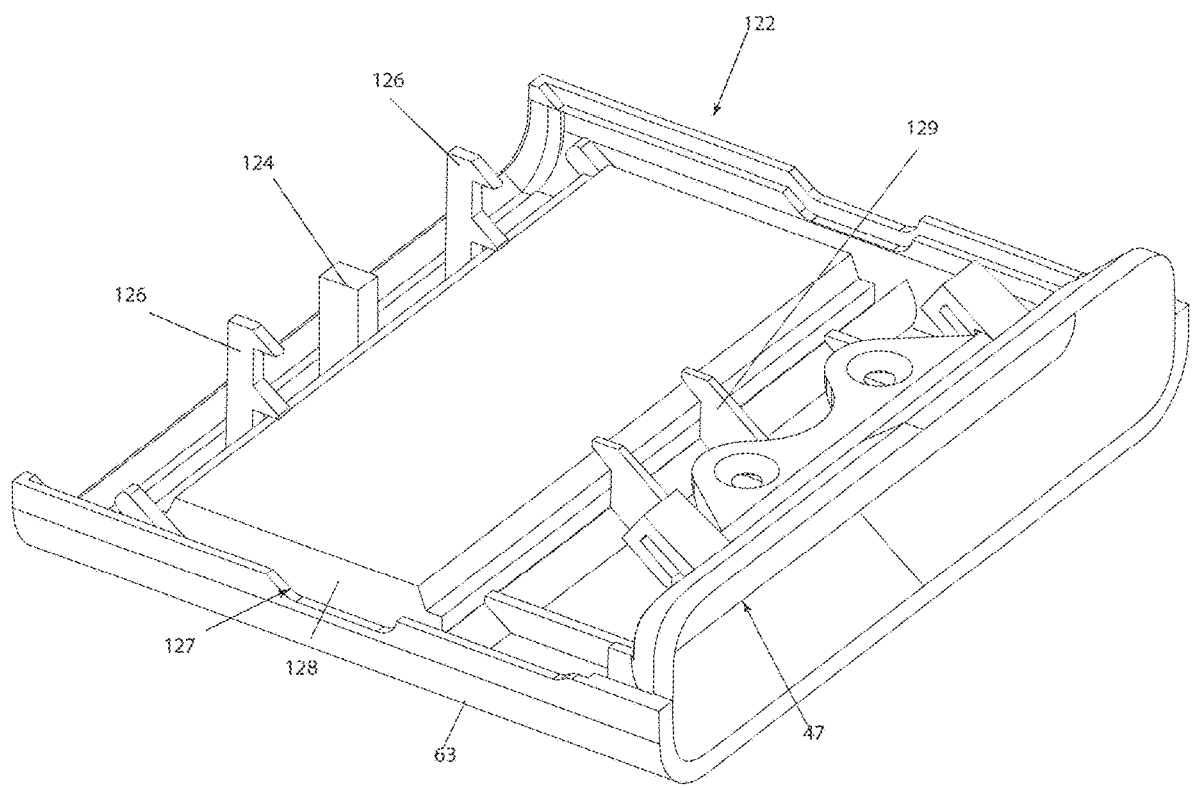

FIGS. 9B, 9C and 9D demonstrate another embodiment of the alert device 40. Shown in FIG. 9B is an embodiment of the physical alert device 40 having a button 112 along its top wall 62. A user may register a new temporary, semi-permanent or permanent navigational point of interest upon noticing such porting of interest while driving. The user need not take eyes off the road to depress the button 112. The button 112, may additionally function as the microphone to accept a user's verbal input containing navigational point of interest. A user's input is preferably acknowledged by a flashing of the display screen 47.

FIG. 9C shows the bottom section 140 of the display device 40 demonstrating the actuator 146, which completes a circuit along the circuit board 142, which causes user input to be recorded on the software application (60). The depression of the actuator 146 also causes one or a plurality of LEDs 144 to illuminate, acknowledging the entry to the user. Also shown is an input/output or charge port 148. The circuit board 142 processes signals received from an electronic device (30) to generate alerts via a flashing screen display 47 or an audio message and initiates messages containing user input via the actuator 146 to the client device 30.

FIG. 9D is a diagram of the top section 122 of the alert device 40 showing a battery compartment 127 containing a battery 128. Rear snap rods 126 and front snap rods 129 hold the battery 128 removably in place. The actuator rod 124 is in contact with the actuator 146 at one end and the button 112 at its other end, or with the top wall 63 forming its top end. Depressing the button 112, or the entire top wall 63 causes the actuator rod 124 to depress the actuator 146, thus completing the circuit and recording user input.

Figure 9E:
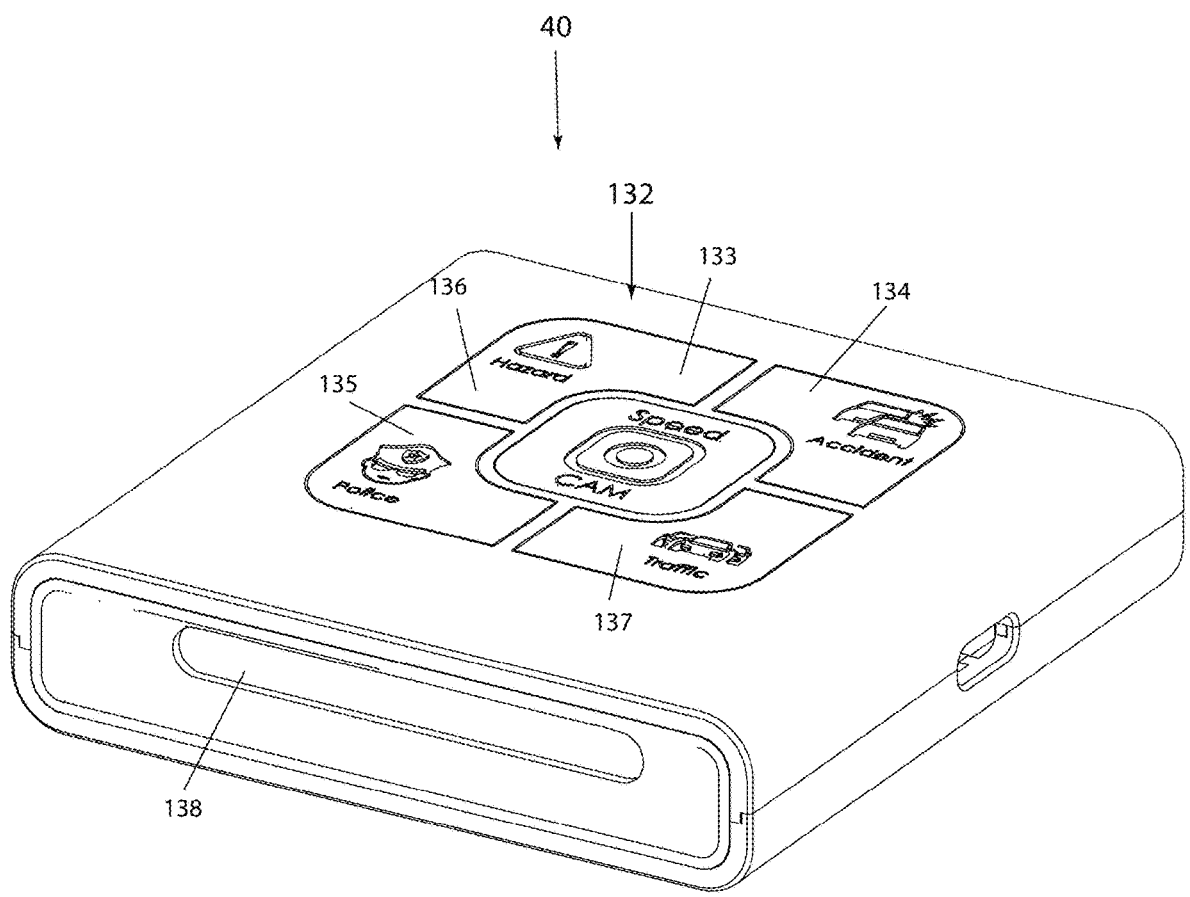
FIG. 9E is an additional embodiment of the physical alert device.

FIG. 9E demonstrates another alternative embodiment of the physical alert device 40. The embodiment shown provides a key cluster 132. Each one of the keys in cluster 132 is in close proximity to the adjoining keys and is shaped differently than the adjoining keys of the cluster 132. The various shapes of the keys 132 are configured to induce tactile recognition of the key functions. A user is able to recognize what each key does without needing to take eyes off the road. While different key clusters 132 are possible, the cluster shown is configured to enter into the onboard storage of a client device (30) associated with this physical alert device the following navigational points of interest: the speed camera 133, traffic hazard 134, police sentinel 135 or police activity, accident key 137, and a hazard key 136. Additional or fewer keys may be possible, and a different configuration may also be possible. The speed camera sensor 133 is the most common navigational point of interest and is therefore centrally placed. Alternatively, the keys may be arranged in any configuration, shape or cluster. Any of the keys provided may also be utilized to adjust the intensity of the alert. For example, a user may hold down a speed camera sensor 133 for a period of time causing the alerting flash to be dimmer during an alerting action or lowering the degree of vibration or flashing of other equipment within the vehicle 90 used for alerting.

Additionally, the key cluster 132 is integrated with a microphone to accept commands using voice activation, and a microphone to confirm a command or communicate a message (32) from another user. As shown in FIG. 9C, a depression of any of the keys preferably produced a confirmation flash from a different LED diode 144 or a combination of diodes/bulbs 144. For example, a speed camera key 133 would produce a confirmatory flash from two middle bulbs 144, or bulbs of red color, while a sentinel key 135 may produce a blue flash or a confirmation from diodes at the edges of the key cluster 132. The flashing of diodes is visible to a user through screen 138. Notably any other type of confirmatory flashes is possible. The difference between the assenting flashes on the physical alert device are preferred as a final check to the inputting user that the database was updated with the appropriate navigational point of interest.

Figure 10B:
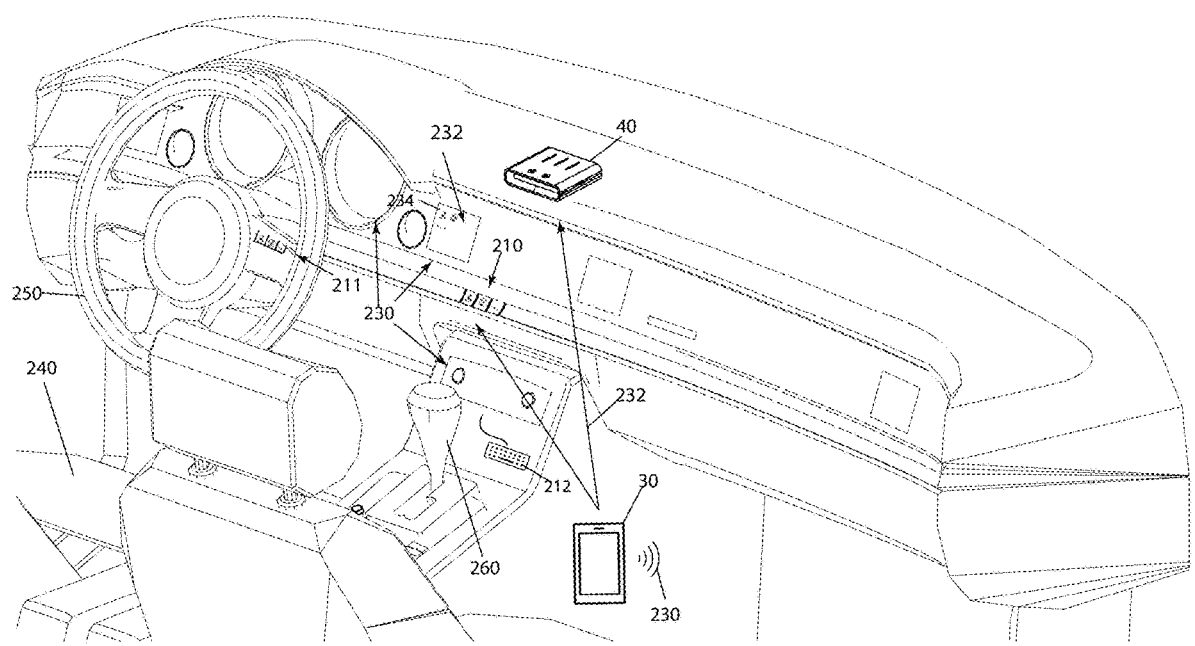
FIG. 10B is a diagram of an interior of a vehicle showing additional equipment of the disclosed system that has been integrated into vehicle circuitry, added to steering wheel or which may be added to vehicle infotainment system.

FIG. 10B demonstrates an additional function of the physical alert device 40 or the software application (60) running on the client device 30, which connects to a vehicles entertainment system (57) and may direct alerts regarding navigation points of interests directly to the navigation screen 160 or to a holographic heads-up projection 150. The client device 30 communicates with the physical alert device 40 when the client device 30 is in radio wave range with the client device (30). When the client device (30) does not detect the physical alert device, the client device (30) may be configured to place the software application into a passive state to conserve battery with only a periodic probing to detect the physical alert device 40 is enabled, and once a physical alert device 40 is enabled, the software application 60 automatically connects to the detected physical alert device 40, with the software application 60 becoming active.

The client device (30) running the software application (60) would primarily be a mobile phone or a tablet computer. Alert published to the holographic heads-up projection display 150 may alternatively originate from the software application (60) and be transmitted by the client device (30) directly to the vehicle's internal infotainment or navigation systems. Some of the secondary receivers of the agitational alert messages from the software application 60 may be other interior features of the vehicle, such as seats, interior lighting and steering wheel, which may vibrate, flash or illuminate when an agitational alert is received from the software application 60.

FIG. 10 demonstrates another embodiment of the disclosed system. While a user may update the parent data storage or onboard database with additional navigational points of interest by using keys (110) on the physical alert device 40, additional input keys may be integrated into the vehicles circuitry, for example on the dashboard 210, thumb buttons 211 may be provided on a poke of a steering wheel 250. The software application (60) may be configured to connect to vehicle's API. A vehicle's infotainment system's output screen 232 may be further instrumented to contain the virtual or touch keys 234 that are configured to update the parent data storage or onboard database with additional navigational points of interest via input from a user. When instrumented into a vehicle's equipment, the keys may be interacted with the software application (60) running on vehicles native circuitry or may alternatively seek a proximally located client device 30 and become enabled on user preference or if the client device 30 is not available for such input, or if the client device 30 directs that the input be the keys located within vehicles equipment (210, 211 or 234). Also shown in FIG. 10B is a clip-on device 212. The clip-on device may be plugged into an input port of a vehicle or may function through short range radio signal to interact with the client device 30, or the software application (60) running by vehicle's electronics or on a client device 30. The software application 60 would be configured to accept input from an external device.

The software application (60) on the client device 30 that is proximate to the particular vehicle may be configured to utilize various vehicle interior equipment features (90) to generate the alert. For example, alerts may be generated by lighting the frame around the gadgets 230 around the instrument panel various buttons or infotainment screen equipment, The infotainment system may be configured to execute a copy of the software application (60) which would trigger the alert device 40 or the instrument panels 230 to display visual or audio alerts when detecting proximity to a navigational point of interest. It should be noted that alerts can be generated by utilizing any other equipment within a vehicle, such as vibration of the seats 240 or control stalks, such as the gear shift stalk 260. Additionally input keys may be located anywhere on the surface of the vehicle interior, or user input may be created through verbal commands.

Although this invention has been described with a certain degree of particularity, it is to be understood that the present disclosure has been made only by way of illustration and that numerous changes in the details of construction and arrangement of parts may be resorted to without departing from the spirit and the scope of the invention. While various inventive aspects, concepts and features of the inventions may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts, and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims, as currently written or as amended or added in the future. Descriptions of exemplary methods or processes are not limited to inclusion of all steps as being required in all cases, nor is the order that the steps are presented to be construed as required or necessary unless expressly so stated.

The invention claimed is:

1. An alert system comprising; a software application; said software application executing on a client device; wherein said client device being a computer device; said software application configured to receive data from a plurality of sources; said software application configured to wirelessly connect to at least one alert receiver; the software application configured to detect direction of travel of said client device; wherein one of said at least one alert receiver is a physical alert device; and wherein said software application configured to produce an agitational signal at a point prior to a location where at least one of a plurality of navigational points of interest and said direction of travel intersect; wherein said software application is configured to determine whether said physical alert device is proximally near to said client device; and wherein said software application determines whether a connection exists between said client device and said physical alert device; wherein said agitational signal is sent by said software application to said physical alert device when said physical alert device is within range of said software application and connected to said client device, and wherein said agitational signal is configured to display on said client device when said physical alert device is not connected to said client device.

2. The alert system of claim 1, wherein said data is further comprised of a plurality of navigational points of interest, and a plurality of additional factors appurtenant to said navigational point of interest.

3. The alert system of claim 2, wherein a source of said data is preloaded instances of said data, or said data received from at least one of said client device.

4. The alert system of claim 3, wherein said plurality of sources is comprised of a user input from said client device, user input from said physical alert device, a parent data storage, another client device or any combination thereof.

5. The alert system of claim 4, wherein said software application is configured to enter a passive state when said software application detects a disconnect from said physical alert device; wherein said software application is configured to continuously probe for a connection to said physical alert device.

6. The alert system of claim 5, wherein said software application is configured to detect whether said navigational point of interest is to be shared with all users of said software application or a limited said navigational point of interest to client device based on number or duration of depression of keys for user entry.

7. The alert system of claim 2, wherein said plurality of sources is comprised of a user input from said client device, user input from said physical alert device, a parent data storage, another client device or any combination thereof.

8. The alert system of claim 3; wherein said physical alert device is further comprised of a wireless receiver and transmitter; wherein said receiver is configured to receive said agitational signals and emitting an alert in response to said agitational signals.

9. The alert system of claim 7, wherein said software application is configured to accept user input through voice command or by actuations of at least one key on said physical alert device; and wherein user input creates another of said data that is configured to be stored on said client device, or stored on said parent data, or sent to at least one other client device or any combination thereof; and wherein said user input may be made through a client device, a vehicle infotainment system, or a physical alert device.

10. The alert system of claim 7, wherein said software application is configured to accept user input through voice command or by actuations of at least one key on vehicle's steering wheel, dashboard, vehicle infotainment output screen or any combination thereof.

11. The alert system of claim 7, wherein said software application is configured to accept user input through a clip-on device.

12. The alert system of claim 4, wherein said software application is configured to disable agitational messages when a device on which said software application is executing is not moving.

13. The alert system of claim 4, wherein said software application is configured to limit user input after maximum entries or in the event of duplicate entries.

14. The alert system of claim 4, wherein a user is able to control alert intensity by using keys on said physical alert device or said vehicle instrumentation.

15. The alert system of claim 4, wherein said software application is configured to detect when a secondary alert device is in range of said client device and wherein if said secondary alert device is not in range, said software application is configured to activate alert equipment on said device where said software application is running.

16. The alert system of claim 4, wherein said software application is configured to enable a user to set a removal date for a navigational point of interest entered by said user.

17. The alert system of claim 9, wherein said at least one key is further comprised of a speed camera key, hazard key, traffic key, police sentinel key.

18. The alert system of claim 9, wherein said at least one key is configured to identify user input of said navigational point of interest by a sequence of button presses depressions.

19. The alert system of claim 2, wherein said plurality of additional factors includes a direction of travel of said client device, speed of travel of said client device, time of travel of said client device, type of hazard or any combination thereof.

20. The alert system of claim 2, wherein any of said plurality of additional factors have automatic configurations set by said software application or configured by a user of said client device.

21. The alert system of claim 2, wherein the software application is configured to set a color of a screen icon representing any one of said plurality of navigational points of interest based on source of said data or configuration of any one of said plurality of additional factors.

22. The alert system of claim 2, wherein the software application is configured to send an agitational message to said physical alert device together with instruction to utilize an alert of specific color as determined by the type of the navigational point of interest.

23. The alert system of claim 3, wherein said physical alert device or instrumentation of a vehicle is configured to generate a confirmatory illumination in response to a user entry of said navigational point of interest; wherein said confirmatory illumination differs based on the type of navigational point of interest.

24. The alert system of claim 2, further comprising a plurality of screen icons; wherein at least one of said screen icons is displayed on said client device or on a vehicle infotainment system.

25. The alert system of claim 2, wherein said client device is configured to send agitational signals to at least one other client device in form of a short message.

26. The alert system of claim 9, wherein a second one of said at least one alert receiver is a vehicle heads up display.

27. The alert system of claim 9, wherein a second one of said at least one alert receiver is a vehicle interior equipment comprising instrument illumination, key illumination, interior lighting, vibration of vehicle seats, illumination of vehicle actuation knobs or stalks wherein a response to said agitational signal may be a vibration or illumination or shift of said vehicle equipment.

28. The alert system of claim 3, wherein said at least one client device is a vehicle's internal application support interface; wherein said software application is configured to receive input and send alerts to said application support interface.

29. The alert system of claim 3, wherein said software application is configured to generate alerts proportional to speed of travel of a device where said software application is executing.

* * * * *